(12) United States Patent (10) Patent No.: US 9,647,916 B2
Huey et al. (45) Date of Patent: May 9, 2017

(54) COMPUTING AND REPORTING LATENCY IN PRIORITY QUEUES

(71) Applicant: General Instrument Corporation, Horsham, PA (US)

(72) Inventors: Michael G. Huey, Perrineville, NJ (US); James R. Harris, Haddonfield, NM (US); Joshua R. Wagner, Huntington Valley, PA (US); Hari K. Boddupalli, West Dundee, IL (US)

(73) Assignee: ARRIS Enterprises, Inc., Suwanee, GA (US)

( * ) Notice: Subject to any disclaimer, the term of this patent is extended or adjusted under 35 U.S.C. 154(b) by 127 days.

(21) Appl. No.: 14/062,143

(22) Filed: Oct. 24, 2013

(65) Prior Publication Data

US 2014/0119230 A1 May 1, 2014

Related U.S. Application Data

(60) Provisional application No. 61/719,372, filed on Oct. 27, 2012, provisional application No. 61/764,324, filed on Feb. 13, 2013.

(51) Int. Cl.
*H04L 12/26* (2006.01)
*H04L 12/28* (2006.01)
(Continued)

(52) U.S. Cl.
CPC ...... *H04L 43/0858* (2013.01); *H04L 43/0852* (2013.01); *H04L 47/10* (2013.01); *H04L 49/90* (2013.01)

(58) Field of Classification Search
CPC ............. H04L 12/2602; H04L 12/5689; H04L 12/569; H04L 12/5694; H04L 12/5695; H04L 2012/5678; H04L 2012/5681; H04L 43/0852; H04L 47/10; H04L 47/24; H04L 47/50; H04L 47/52; H04L 47/6215;
(Continued)

(56) References Cited

U.S. PATENT DOCUMENTS 6,711,137 B1 * 3/2004 Klassen ................ H04L 41/142
370/252
6,778,546 B1 * 8/2004 Epps .................... H04L 12/5693
370/389
(Continued)

*Primary Examiner* — Alpus H Hsu
(74) *Attorney, Agent, or Firm* — Lori Anne D. Swanson

(57) ABSTRACT

Channel traffic in Internet Protocol (IP) networks may be placed in priority queues upon receipt. Providing an efficient way for operators to use the channel may enable the operator to better make decisions for configuring the priority queues, maximizing effectiveness. For example, measuring a queue latency and making a queue latency visible to an operator may enable a better configuration of priority queues. Further, an improved latency metric may assist an operator to judge a relative effect that priority assignments have on traffic over a channel. Such techniques may be applied to an out-of-band (OOB) channel to include an assessment of parameters important for optimizing the configuration of priority queues in a downstream channel. For example, an improved latency metric for assisting an operator to judge the relative effect that priority assignments have on traffic is a parameter assessed for better use of an OOB channel.

14 Claims, 9 Drawing Sheets

(51) Int. Cl.
  *G06F 3/00* (2006.01)
  *H04L 12/801* (2013.01)
  *H04L 12/861* (2013.01)

(58) Field of Classification Search
  CPC ..... H04L 47/6295; H04L 47/70; H04L 47/78; H04L 47/805; H04L 49/90; H04L 49/9005
  See application file for complete search history.

(56) References Cited

U.S. PATENT DOCUMENTS

| | | | |
|---|---|---|---|
| 6,813,243 B1 * | 11/2004 | Epps | H04L 47/10 370/235 |
| 6,977,930 B1 * | 12/2005 | Epps | H04L 12/5693 370/392 |
| 7,002,914 B2 * | 2/2006 | Cloonan | H04L 47/10 370/232 |
| 7,149,799 B2 | 12/2006 | Weaver | |
| 7,643,983 B2 * | 1/2010 | Lumb et al. | 703/24 |
| 7,720,065 B2 * | 5/2010 | Liu et al. | 370/389 |
| 7,778,265 B2 * | 8/2010 | Evans | H04L 47/56 370/412 |
| 7,809,016 B2 * | 10/2010 | Zeitak | H04L 47/10 370/468 |
| 7,872,973 B2 * | 1/2011 | Sterne | H04L 47/10 370/235 |
| 7,889,743 B2 * | 2/2011 | Evans | H04L 1/0083 370/351 |
| 7,917,903 B2 * | 3/2011 | Lumb et al. | 718/100 |
| 7,921,410 B1 | 4/2011 | Symons et al. | |
| 7,944,840 B2 | 5/2011 | Martin et al. | |
| 7,958,260 B2 | 6/2011 | Cloonan et al. | |
| 8,068,429 B2 * | 11/2011 | Rittmeyer | H04L 12/2697 370/241 |
| 8,165,144 B2 * | 4/2012 | Tatar | H04L 47/10 370/230.1 |
| 8,238,361 B2 | 8/2012 | Carlsson et al. | |
| 8,280,994 B2 | 10/2012 | Blouin et al. | |
| 8,767,568 B2 * | 7/2014 | Serrano Solsona | H04L 12/5693 370/232 |
| 2007/0070907 A1 * | 3/2007 | Kumar | H04L 47/10 370/235 |
| 2007/0248101 A1 * | 10/2007 | Zeitak | H04L 47/10 370/395.41 |
| 2008/0056192 A1 * | 3/2008 | Strong | H04L 12/5693 370/331 |
| 2009/0304014 A1 * | 12/2009 | Evans et al. | 370/412 |
| 2014/0105218 A1 * | 4/2014 | Anand et al. | 370/412 |

* cited by examiner

LATENCY

| PACKET ID | LATENCY (INTERVALS) |
|---|---|
| A | 1 |
| B | 2 |
| C | 3 |
| D | 4 |

AVERAGE LATENCY

| TOTAL LATENCY | 10 |
|---|---|
| NUMBER OF PACKETS SERVICED | 4 |
| AVERAGE LATENCY | 2.5 |

LATENCY

| PACKET ID | LATENCY (INTERVALS) |
|---|---|
| A | 2 |
| B | 3 |
| C | 4 |
| D | 5 |

AVERAGE LATENCY

| TOTAL LATENCY | 14 |
|---|---|
| NUMBER OF PACKETS SERVICED | 4 |
| AVERAGE LATENCY | 3.5 |

LATENCY

| PACKET ID | LATENCY (INTERVALS) |
|---|---|
| A | 1 |
| B | 2 |
| C | 3 |
| D | 6 |

AVERAGE LATENCY

| TOTAL LATENCY | 12 |
|---|---|
| NUMBER OF PACKETS SERVICED | 4 |
| AVERAGE LATENCY | 3.0 |

LATENCY

| PACKET ID | LATENCY (INTERVALS) |
|---|---|
| A | 2 |
| B | 3 |
| C | 4 |
| D | 5 |
| E | 5 |

AVERAGE LATENCY

| TOTAL LATENCY | 19 |
|---|---|
| NUMBER OF PACKETS SERVICED | 5 |
| AVERAGE LATENCY | 3.8 |

LATENCY

| PACKET ID | LATENCY (INTERVALS) |
|---|---|
| A | 1 |
| B | 2 |
| C | 3 |
| D | 4 |
| E | 4 |

AVERAGE LATENCY

| TOTAL LATENCY | 14 |
|---|---|
| NUMBER OF PACKETS SERVICED | 5 |
| AVERAGE LATENCY | 2.8 |

COMPUTING AND REPORTING LATENCY IN PRIORITY QUEUES

CROSS-REFERENCE TO RELATED APPLICATIONS

This application claims priority to U.S. provisional patent application Ser. No. 61/719,372 filed on Oct. 27, 2012 and to U.S. provisional patent application Ser. No. 61/764,324 filed on Feb. 13, 2013, the contents of both are incorporated herein by reference in entirety.

BACKGROUND

In Internet Protocol (IP) networks, routing and aggregation difficulties, e.g., random and often unpredictable ingress packet traffic, must be handled. Packet traffic is classified, prioritized, rate-shaped, and scheduled or allocated its turn on a fixed bandwidth egress connection.

An out-of-band multiplexer/modulator ("OM"), examples of which include the OM2000 available from Motorola Mobility, combines multiple sources of data into an output transport stream, such as an MPEG-2 transport stream. As depicted in FIGS. 1 and 2, an OM 101 is able to receive input, e.g., UDP/IP Ethernet and RS-530 or RS-232 serial data, from multiple external devices 102a-n such as a network controller (NC) 102a, Remote Addressable DANIS/DLS (RADD) 102b, an emergency alert system (SCTE-18) device 102c, etc.

A conventional OM 101 transmits an out-of-band (OOB) data stream to digital set-tops, either individually or on a broadcast basis, providing, for example, a signaling channel, transmission of program guide information, code downloads, infrared codes, application information, and the downstream path in an interactive system.

In a conventional OM, an SCTE-55 channel rate is enforced at the OM, requiring buffering.

Conventional OM devices can use a Quadrature Phase Shift Key Modulator (QPSK) to modulate data on a 1.5 MHz wide carrier in the 71 to 129 MHz band with transmitted data multiplexed either internally or externally. Null packets are used as necessary to perform rate aggregation between inputs and a 2.048 Mbps output. Forward error correction (FEC) encoding and interleaving are provided to protect data integrity.

In some conventional OMs 101, as depicted in FIG. 1, maximum depth of a single first-in-first-out (FIFO) queue 120 is limited by the application which is most sensitive to timeout. In other OMs 101, arbitrarily large queue sizes and multiple queues, as depicted by queues 103, 104, and 105 in FIG. 2, can be used, allowing prioritization of traffic.

In an illustrative input process, packets from each source arrive asynchronously, and in unpredictable bursts. A user configures each source to be assigned to high (1), medium (2), or low (3) priority. Upon arrival, packets from each source are written into the designated priority queue, such as the high priority queue 103, medium priority queue 104, and low priority queue 105 shown in FIG. 2. Priority buffering allows network controller traffic to be set at a higher priority and carouselled data (e.g., Guide data, SDV minicarousel, etc) to be set to a lower priority.

FIG. 3 depicts input, output, and results, in an illustrative example of an OM 101 device. As illustrated by FIG. 3, an example input, a 2 MB/s RF output, is received at 301 at a device. At 302, a separate, precisely-timed periodic process is configured to check for available packets, checking in the priority queues at 303, 304, and 305. If there are packets, the packets from each buffer are received at 307, 308, and 309. If desirable to maintain a constant bit rate with a variable payload, null packets that carry no data may be retrieved at 311. The packets retrieved are serviced by writing the packets to an RF ring buffer at 310. After an interval available for buffer retrieval at 306 (i.e., wait a period of time, such as 750 s in this example), the method or device checks for any additional packets available at 302 in the next interval. However, not all packets retrieved in the prior interval may have been serviced yet, since a packet in a lower priority queue is serviced only if there is nothing on a higher priority queue. For example, if buffer PBQ1 has a higher priority than the PBQ2 and PBQ3 buffers, packets from the PBQ1 buffer queue retrieved at 307 are serviced before packets retrieved at 308 and 309. If the current interval closes prior to the servicing of all packets in the buffers, some packets may be lost or dropped. Accordingly, in illustrative results, the highest priority queue has minimum service delay, and the lowest priority queue is most likely to be dropped during congestion.

FIG. 4 depicts inputs into an OM 101 which requires OM configuration, e.g., by an operator. FIG. 4 includes further input examples such as a Switched Digital Video (SDV) minicarousel 102d, and a guide (e.g., an electronic program guide) 102e, etc. While an OM manufacturer may provide general recommendations for configuration, an operator (e.g., a multiple system operator (MSO), cable or broadband operator, etc.) has many choices when configuring the priority assignments, e.g., 103, 104, 105.

BRIEF DESCRIPTION OF THE DRAWINGS

For the purpose of illustrating embodiments described below, there are shown in the drawings example constructions of the embodiments; however, the embodiments are not limited to the specific methods and instrumentalities disclosed. In the drawings.

Figure 1:
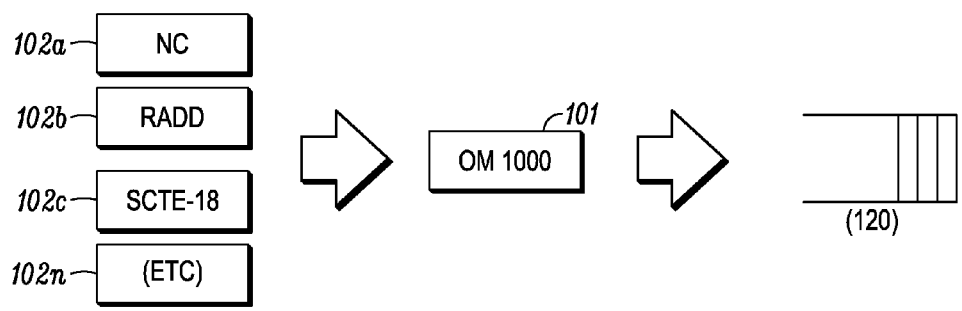
FIGS. 1, 2, and 4 depict examples of conventional out-of-band modulators (OM).
Figure 2:
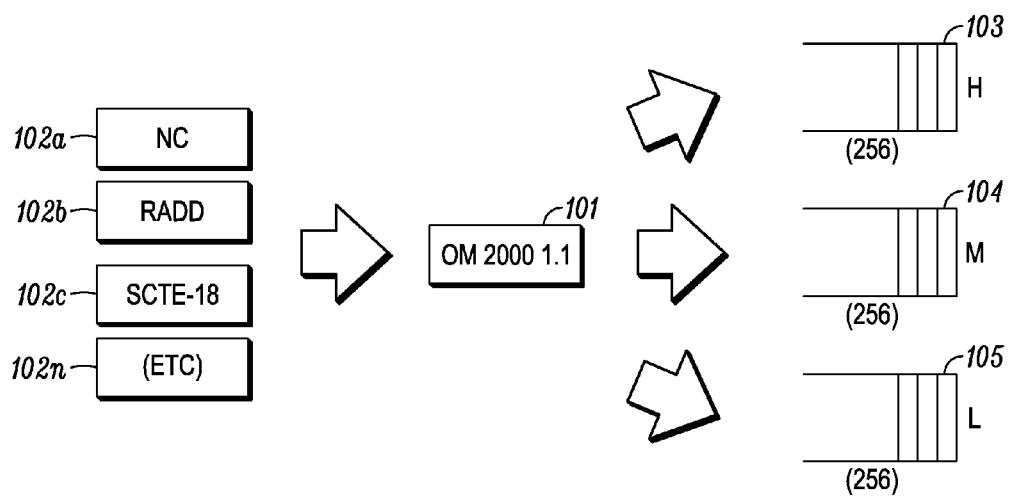
Figure 3:
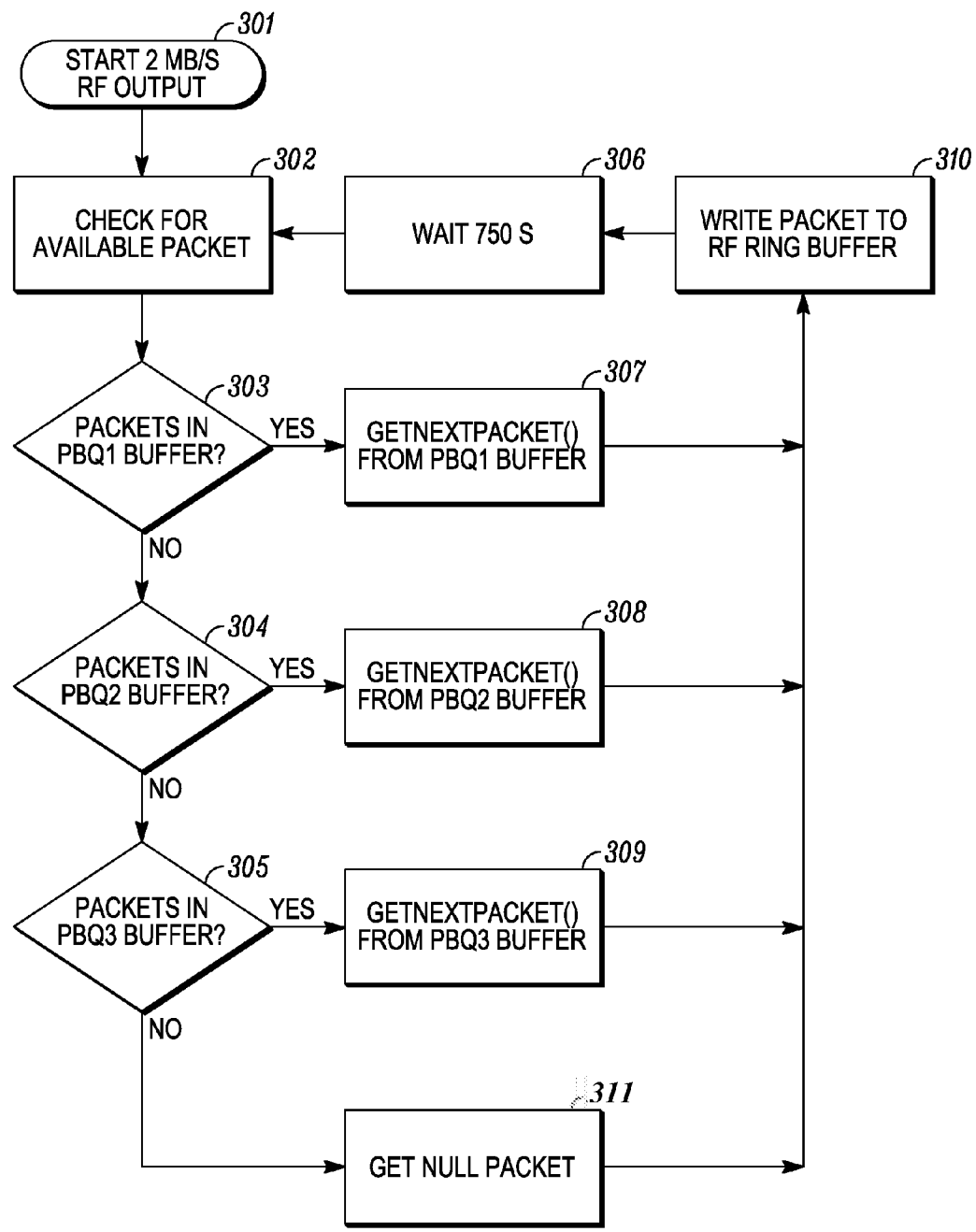
FIG. 3 depicts an example input, output, and results of an example OM device.
Figure 4:
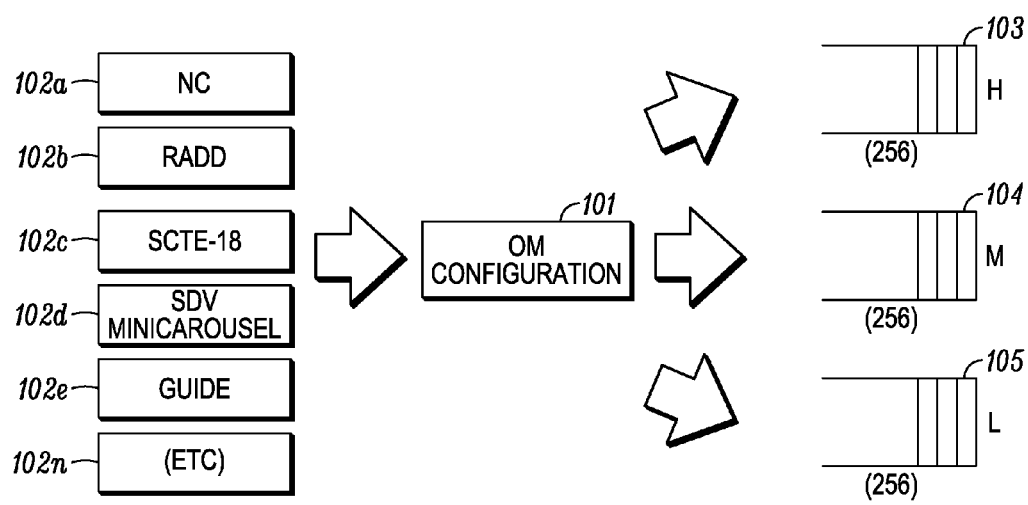

It is noted that while the accompanying FIGs. serve to illustrate embodiments of concepts that include the claimed invention, and explain various principles and advantages of those embodiments, the details depicted in the FIGs. would be readily apparent to those of ordinary skill in the art having the benefit of the description herein.

DETAILED DESCRIPTION

Disclosed herein are techniques for providing an efficient way for operators to use an out-of-band (OOB) channel. Embodiments are disclosed that provide manners for assessing parameters important for optimizing the configuration of priority queues in the downstream channel, particularly useful as more and more OOB traffic becomes typical. For example, disclosed is an improved latency metric for assisting an operator to judge the relative effect that priority assignments have on traffic. As described herein, the disclosed techniques offer the opportunity for an operator to view queue latency, thereby enabling the operator to better make decisions about how to configure the priority queues for maximum effectiveness.

In particular, an embodiment is disclosed for measuring the queue latency and providing this feedback to the operator. In embodiments, the system makes queue latency visible to the operator, enabling the operator to make better decisions about how to configure the priority queues for maximum effectiveness. An embodiment enables more efficient use of limited downstream bandwidth available out-of-band (e.g., SCTE-55).

In order to assess whether a configuration is optimized, operators may measure actual latency effects. A desirable implementation for measuring latency effects is computationally efficient and not burdensome to system operation in that it does not require system calls, taking advantage of interrupt cycles to perform the work of the calculation. To better understand the disclosed embodiments, first reviewed are the deficiencies of the conventional approaches. Conventional approaches to measuring latency have included timestamping each packet, the use of sample packets, and applying queuing theory.

In the conventional timestamping approach, a packet is timestamped as it enters and again as it leaves, calculating the difference. Such an approach usually requires 1) the need to reference a system clock via a system call during the interrupt process, which adds system overhead and delays; 2) a clock precision that is at least as good as the servicing interval (750 microseconds); 3) a brute force approach involving a need to allocate memory for two timestamps, for each packet. The calculation resulting from the conventional approach is inadequate due to 1) huge numbers with little useful precision; 2) OM's on-board system clock that is inadequate at 60 ticks/sec=16.67 milliseconds, and rolls over after a number of days; 3) external references such as Unix/C/GPS time are in whole seconds (e.g., for Unix time, the 32-bit signed integer means an epoch (1 Jan. 1970) which is a waste of bits for this application).

Another conventional approach focuses on sampling the traffic. For example, one can timestamp every Nth packet (e.g., every 100th packet), or every T interval (e.g., once every 10 milliseconds). Such a sampling approach is inadequate due to 1) the use of a statistical sample which is, by definition, prone to loss; 2) the need to choose N carefully (e.g., a high value of N increases loss, and the loss gets worse with large fluctuations in instantaneous traffic rates, which counters the reason for buffering and measuring latency to begin with); 3) higher values for N raise the floor, i.e., increase the probability that no calculation can be performed at low traffic rates.

Another conventional approach applies a conventional queuing theory (M/M/1, M/G/1, etc.). For example, one conventional model is:

$$P[(N(t+\tau) - N(t)) = k] = \frac{e^{-\lambda\tau}(\lambda\tau)^k}{k!}$$

$$k = 0, 1, \ldots,$$

The queuing theory approach is inadequate to 1) the use of the Poisson model which, while may be suitable for upstream traffic, is not suitable for downstream traffic, which has few sources, some of which are not independent memoryless processes; 2) for any model, some defining characteristics of the offered traffic (such as average message rate) need to be known in advance; 3) defining characteristics of the offered traffic is subject to change based on what servers are present.

It is noted that a packet may be subject to a latency when it traverses the system, and the latency can be measured directly. However, where the goal is to assess overall effects due to a configuration, the individual measurements are not sufficient.

Disclosed are embodiments for characterizing average queue latency. Calculating the average latency for a given time interval may be based on the direct observation of queue depth, which can account for both incoming traffic bursts and service pre-emption. As described herein, such an approach can be more useful and efficient than conventional approaches. Further disclosed is a manner of reporting the latency such that the latency for any arbitrarily longer time window can be efficiently computed, as described in more detail below.

One can characterize queue latency based on two factors, latency for the queue, and the number of packets subject to said latency.

Figures 5A, 5B, 5C:
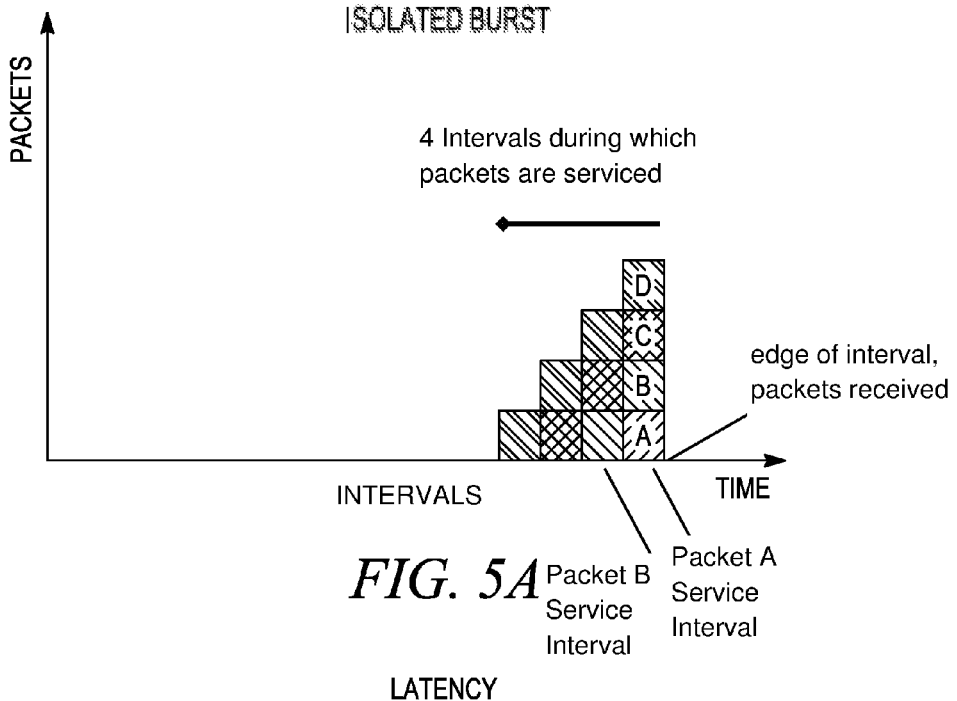
FIG. 5A illustrates an isolated burst of packets measured in a first-in, first-out priority buffer.
FIG. 5B depicts a table that summarizes the number of time intervals that packets wait in a queue.
FIG. 5C depicts a table with the average latency for the example in FIG. 5A.

FIG. 5A illustrates an isolated burst of packets measured in a first-in, first-out priority buffer. In this example, assume there are no queued packets either prior to the burst, or following the burst, i.e., there are no delays. The timeline progresses from right to left, similar to queuing diagrams that illustrate packets approaching from the left and moving to the right. The y-axis represents the number of observed packets during the interval. In this example, four packets A, B, C, and D are initially received. In subsequent intervals, the packets are serviced one at a time, in the order (A, B, C, then D) in which they are received.

All packets are detected before they are serviced; it is assumed that any packets that are received between intervals have been present for the entire cycle, as this represents a conservative approach. The servicing operation can be visualized as occurring on the leftmost edge of the interval.

The table shown in FIG. 5B summarizes the number of time intervals that each packet A, B, C, and D waits in the queue, i.e., latency. For example, packet A experiences a latency of 1 interval. The "total latency" for all packets is the sum of the latency for individual packets during the burst.

The table shown in FIG. 5C provides the average latency for the isolated burst of packets (no delay) shown in FIG. 5A. In this example, the average latency, 2.5, is given by the total latency, 10, divided by the number of packets, 4, serviced during the burst.

Figures 6A, 6B, 6C:
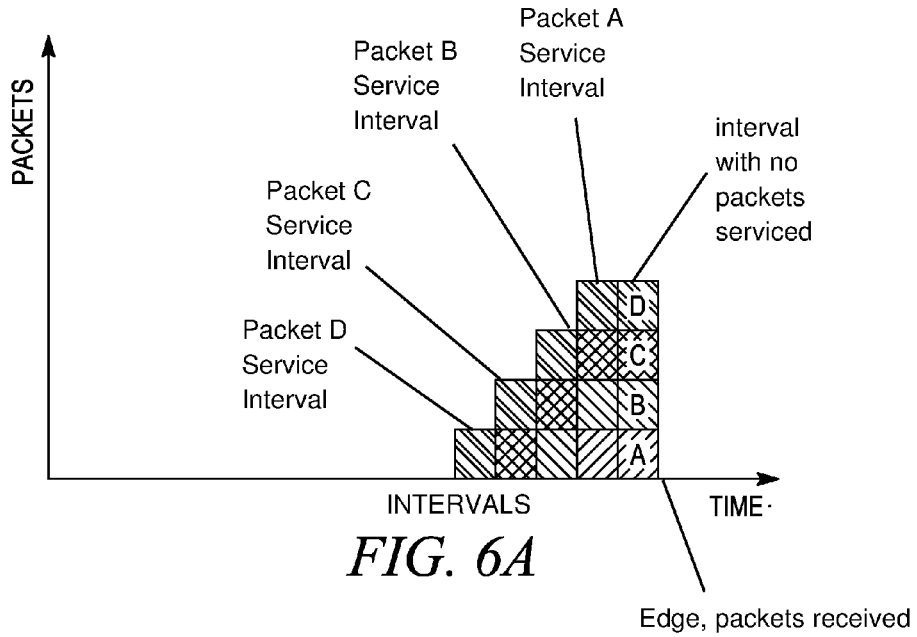
FIG. 6A depicts an example where a delay exists at the start of the burst of the packets.
FIG. 6B depicts a table that summarizes the number of time intervals that packets wait in a queue.
FIG. 6C depicts a table with the average latency for the example in FIG. 6A.

FIG. 6A depicts an example where delays exist at the start of the burst of the packets. Assume four packets A, B, C, and D are detected. In the example shown in FIG. 6A, a queue may not be serviced, due to a higher priority queue having a packet which needs to be serviced. Instead, the queue may be serviced on the intervals that follow, one at a time, in the order in which they are received. In this example, there is a delay of one interval until the queue shown, with the burst of packets A, B, C, and D, is serviced.

The table shown in FIG. 6B summarizes latency for each packet A, B, C, and D for the example in FIG. 6A, where delays exist at the start of the burst. The table shown in FIG. 6C provides the average latency for the burst of packets with the delay at the start. In this example, the average latency, 3.5, is given by the total latency, 14, divided by the number of packets, 4, serviced during the burst.

Figures 7A, 7B, 7C:
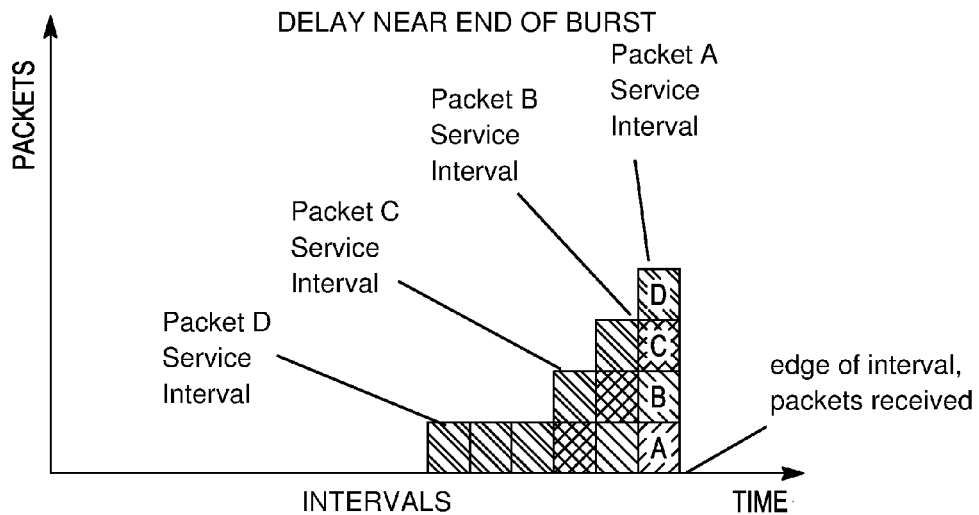
FIG. 7A depicts an example in which a last packet, D, is delayed.
FIG. 7B depicts a table that summarizes the number of time intervals that packets wait in a queue.
FIG. 7C depicts a table with the average latency for the example in FIG. 7A.

FIG. 7A depicts an example in which the last packet, D, is delayed. Assume four packets A, B, C, and D are received. The last packet, D, is delayed by several cycles due to a higher priority queue(s) having several packets which need to be serviced, thus causing a delay at the end of the burst. After those queues are serviced, the present queue is serviced.

The table shown in FIG. 7B summarizes latency for each packet for the example in FIG. 7A, where the last packet is delayed. The table shown in FIG. 7C provides the average latency for the burst of packets where the last packet is delayed. In this example, the average latency, 3, is given by the total latency, 12, divided by the number of packets, 4, serviced during the burst.

As noted, compared to the previous case shown in FIG. 6A with delays at the start of the burst, the burst in FIG. 7 is held for several more cycles, overall. However, the delays occur during a period when there are fewer queued packets. The net result, in this example, is that the average latency is less than that in the previous case.

Figures 8A, 8B, 8C:
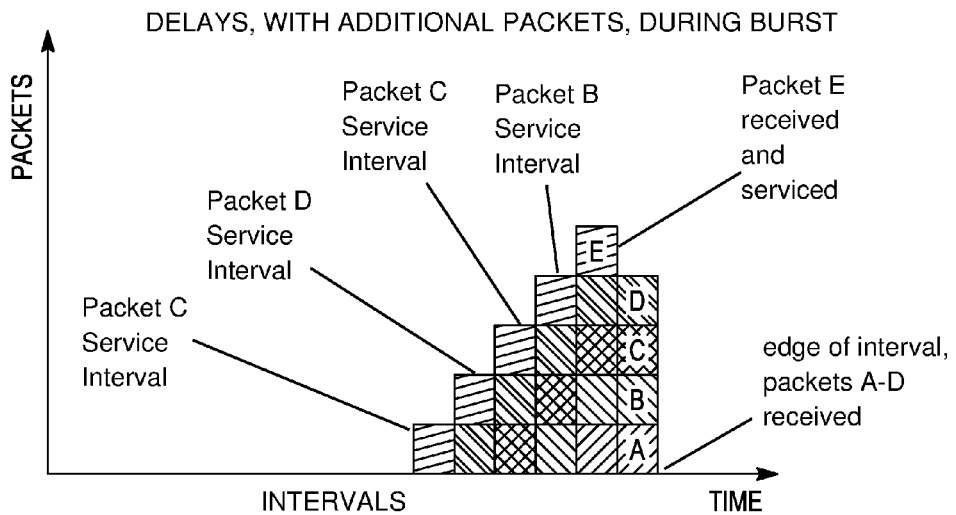
FIG. 8A depicts an example on which a queue is blocked from service due to a higher priority queue.
FIG. 8B depicts a table that summarizes the number of time intervals that packets wait in a queue.
FIG. 8C depicts a table with the average latency for the example in FIG. 8A.

FIG. 8A depicts an example where the queue is blocked from service due to a higher priority queue. Assume, four packets A, B, C, and D are received, and the delay in service is a delay of one interval in this example. Before the queue with packets A, B, C, and D can be serviced on the next interval, an additional packet (denoted by "E") is received.

The table shown in FIG. 8B summarizes latency for each packet for the example in FIG. 8A, where there are delays, with additional packets, during the burst. The table shown in FIG. 8C provides the average latency for the burst of packets in this example. In this example, the average latency, 3.8, is given by the total latency, 19, divided by the number of packets, 5, serviced during the burst.

Figures 9A, 9B, 9C:
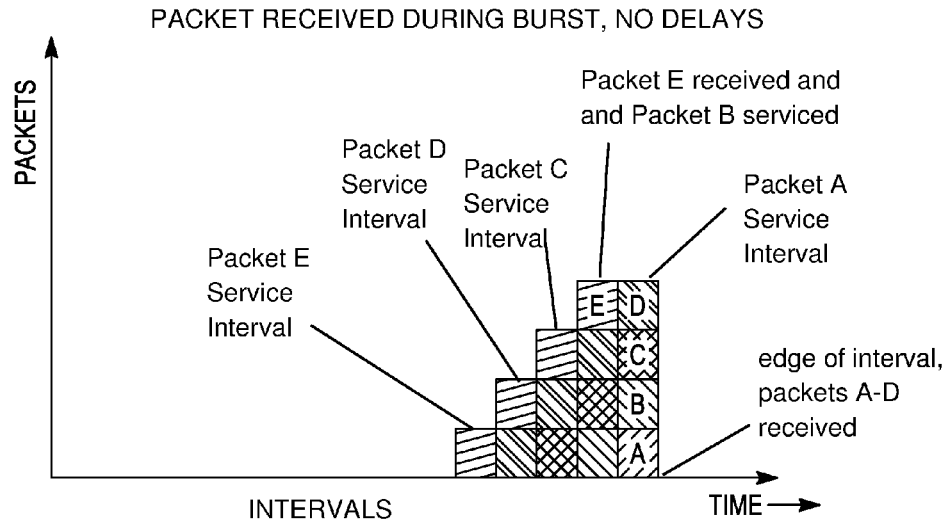
FIG. 9A depicts an example in which a queue with packets A, B, C, and D is serviced without delay, but an additional packet E simultaneously enters the queue.
FIG. 9B depicts a table that summarizes the number of time intervals that packets wait in a queue.
FIG. 9C depicts a table with the average latency for the example in FIG. 9A.

FIG. 9A depicts an example in which the queue with packets A, B, C, and D is serviced without delay, but an additional packet E enters the queue at the "same time," meaning that when the queue is measured on the next interval, there appears to be zero net gain/loss in the queue depth. In subsequent intervals, the packets are serviced one at a time, in the order in which they are received.

The table shown in FIG. 9B summarizes latency for each packet for the example in FIG. 9A, where each of the packets is received during the burst with no delays. The table shown in FIG. 9C provides the average latency for the burst of packets. In this example, the average latency 2.8 is given by the total latency, 14, divided by the number of packets, 5, serviced during the burst.

It is noted that, in the above examples, when an isolated burst occurs during an interval it does not impact latency calculations described herein. But if a burst occurs at the edge of an interval, in embodiments the latency will be attributed according to which side of the interval boundary the burst occurred. In embodiments, the latency is attributed to which side of the interval boundary the packets were queued as well as serviced. In other words, the exact location of the interval boundaries affects the reported latency for either interval.

It can be shown that when computing and reporting the latency over the combined interval, using a weighted average as described above, any errors introduced as a result of the approximations tend to cancel each other. In other words, a larger interval tends to produce even more accurate results, rather than causing the errors to be cumulative.

It is further noted that the total latency over a window is the sum of the queue depths from each individual interval, whether the queue is serviced or blocked during that interval.

In embodiments, the average latency over a window is computed by dividing the total latency by the number of packets successfully serviced.

In embodiments, there is no need to count the number of blocked opportunities, as this is accounted for by the queue depth observations.

On each interval, there are 3 possible outcomes: serviced (data in the queue was serviced), blocked (data was ready in the queue, but was blocked due to a higher-priority queue), or unimportant (there are zero packets in the queue).

In embodiments of the unimportant ("don't care") intervals, the intervals are not factored into the average latency calculation. Based on this, the minimum reportable non-zero average latency for any window may be equal to the duration of one (1) interval. In other words, for embodiments of the OM having intervals of 750 microseconds each, the average latency can never be reported less than 750 microseconds, except when there are no packets which enter the queue during the window (in which case the latency is zero).

It is noted that, in embodiments, the average latency is the same, regardless of when the burst occurs during the window. In embodiments, multiple bursts can be summed together during the window.

If a burst is queued over a time boundary, the disclosed techniques apply—cut the burst into portions, and treat the portions individually.

It is possible to calculate/report the average of separate windows (e.g., to combine intervals using a sliding window method). In such embodiments, the calculation is performed as a weighted average, taking into account the number of packets serviced in the interval. Therefore, whenever average latency is reported, the number of packets is also reported, e.g., "100 packets serviced with average latency of 1875 microseconds." This is an elegant method which can be easily implemented by the OM, or by the end-user.

If packets are queued at the edge of an interval, the reported latency will be an approximation which can vary depending on exact boundaries of the interval, i.e., whether the packets were "binned" into one interval or the next. However, these effects tend to cancel each other, such that combining and reporting larger intervals tends to produce more accurate results, rather than accumulating errors.

Using the disclosed techniques, the end-user can easily characterize multiple, unrelated, non-continuous intervals. For example, 500 packets at 4.5 milliseconds latency may be preferable to 200 packets at 3.0 milliseconds latency, where the comparison can be for different queues, disparate time-frames, or even separate product instances.

A 32-bit integer can fully support the OM's buffer model of 0 to 20,480,000 packets per 60-second interval. This is equivalent to a range of 0 to 15,360 seconds (4.27 hours).

The choice of units affects the data type of the MIB parameter, and when expressed in microsecond time units, this range would exceed an unsigned 32. So, in embodiments, an artificial limit such as 60 seconds is considered for the OM since reporting values higher than this in the headend may be impractical.

Although an OM may be limited to servicing one packet at a time, the disclosed techniques apply if multiple packets are serviced in a given interval.

The following is an example application of the disclosed techniques for use with an out-of-band multiplexer/modulator (OM). For a OM with intervals of 750 microseconds each, increment the aggregate queue depth D by the observed queue depth. If the queue is not preempted by a higher-priority queue, then service the queue, and increment S.

At the conclusion of the 60-second reporting interval, report the aggregate number of serviced packets (S), as well as the average latency (L), where:

$$\overline{L} = 750\mu s \left(\frac{D}{S}\right)$$

Then, clear the aggregate queue depth (D), and clear the number of packets serviced (S).

For the last 15 minutes, report the total number of serviced packets (S) over the last 15 minutes, as well as the average latency (L), where the average latency is weighted by the actual number of serviced packets in each 60-second window. Note that it is generally incorrect to report the average latency for two windows as the simple arithmetic mean of the corresponding latencies, L1 and L2. The proper computation is a weighted average. There are several computational methods, one of which is given by:

$$\frac{1}{\sum S} \sum_{i=1}^{N} S_i L_i.$$

An equivalent and more elegant method is to simply divide the aggregate D by the aggregate S (where D and S are summed over the desired window), i.e., $$i.e., \;\; \frac{\sum D}{\sum S} * 750\mu s$$

For the last 60 minutes, Report S and L, using a weighted average for L. Similar to the 15-minute report.

In embodiments, the average queue depth is given by the total depth divided only by the total number of serviced packets, or (D/S). Further, in embodiments there is no direct measure of the blocked service opportunities, B.

In embodiments, there is no need to call a system clock (e.g., neither realtime nor system clockticks with an arbitrary epoch). Embodiments are disclosed that do not require any real-time clock or timestamping. Rather, in embodiments disclosed, the latency metric may be based only on the accuracy of the queue service interval, using simple integers and counters to avoid floating point calculations. Such computation may be performed during product interrupt cycles without dependence on computationally expensive system calls. Further, embodiments allow intervals to be fully characterized and compared, separately from different time intervals, different queues, or even disparate product instances.

In an embodiment, the calculations are performed as part of the interrupt. Thus, accuracy is based only on the ppm accuracy of the service clock—no stacking of errors.

Embodiments can be implemented using counters, which are easy and fast to increment, not requiring complex floating point calculations at runtime.

In embodiments, computations are averages, but are lossless—all contributions are accounted for. Embodiments account for every packet; conversely, conventional methods for sampling network performance using periodic test packets can provide a lossy approximation of network/system response.

In embodiments, the whole integer is used for calculation. In an embodiment, a 32-bit integer can fully support the OM's buffer model of 0 to 20,480,000 packets per 60-second interval, equivalent to a range of 0 to 15, 360 seconds (4.27 hours).

Embodiments do not require injection of test packets.

In embodiments, the number of affected packets is reported along with the latency value. Advantageously, embodiments easily derive the latency for wider reporting intervals, using simple arithmetic weighting. In embodiments, an end-user is able to derive the latency for any wider reporting interval of interest. The end-user may mathematically characterize multiple, unrelated, non-continuous intervals. The comparison can be for different queues, disparate time frames, or separate product instances. Thus, for example, 500 packets at 4.5 milliseconds latency may be preferable to 200 packets at 3.0 milliseconds latency depending on the comparison.

In embodiments, when multiple intervals are combined, the round-off errors at the edge of the timing intervals are self-cancelling. Thus, longer intervals can improve the accuracy of the metrics, rather than accumulating errors.

It is noted that conventional techniques for latency do not provide a specific method for measuring latency in priority queues (e.g., a measure of packet rate used as a proxy for latency), do not rely on real-time clock or timestamping of each packet in a burst (e.g., du to rescheduling), and do not require the injection of test packets for an approximation of network/system response (thereby subjected to sampling loss).

It is noted that when no packets are received in the averaging window, no calculation may be performed; however, this is true for any method that uses a periodic reporting interval.

Embodiments provide further extensibility. For example, embodiments will work with any number of priority queues. Further embodiments are not limited to "out-of-band" channels; rather, embodiments can be applicable to any system where inputs come in at any rate, and the total output rate is fixed.

Some embodiments may be extensible to an out-of-band data channel (SCTE-55-2), if priority-based queuing is implemented.

In further embodiments, the restriction of fixed output service rates may be extensible to arithmetic or otherwise deterministic rates, with appropriate adjustments to the incrementation of counters, e.g., servicing 4 packets at a time from the highest queue, or servicing 2 packets at a time from the 2 highest queues.

One of ordinary skill in the art appreciates that various modifications and changes can be made to the disclosed embodiments without departing from the scope of the present invention as set forth in the claims below. Accordingly, the specification and FIGs. are to be regarded in an illustrative rather than a restrictive sense, and all such modifications are intended to be included within the scope of the present invention.

In one or more examples, the functions described herein may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 10:
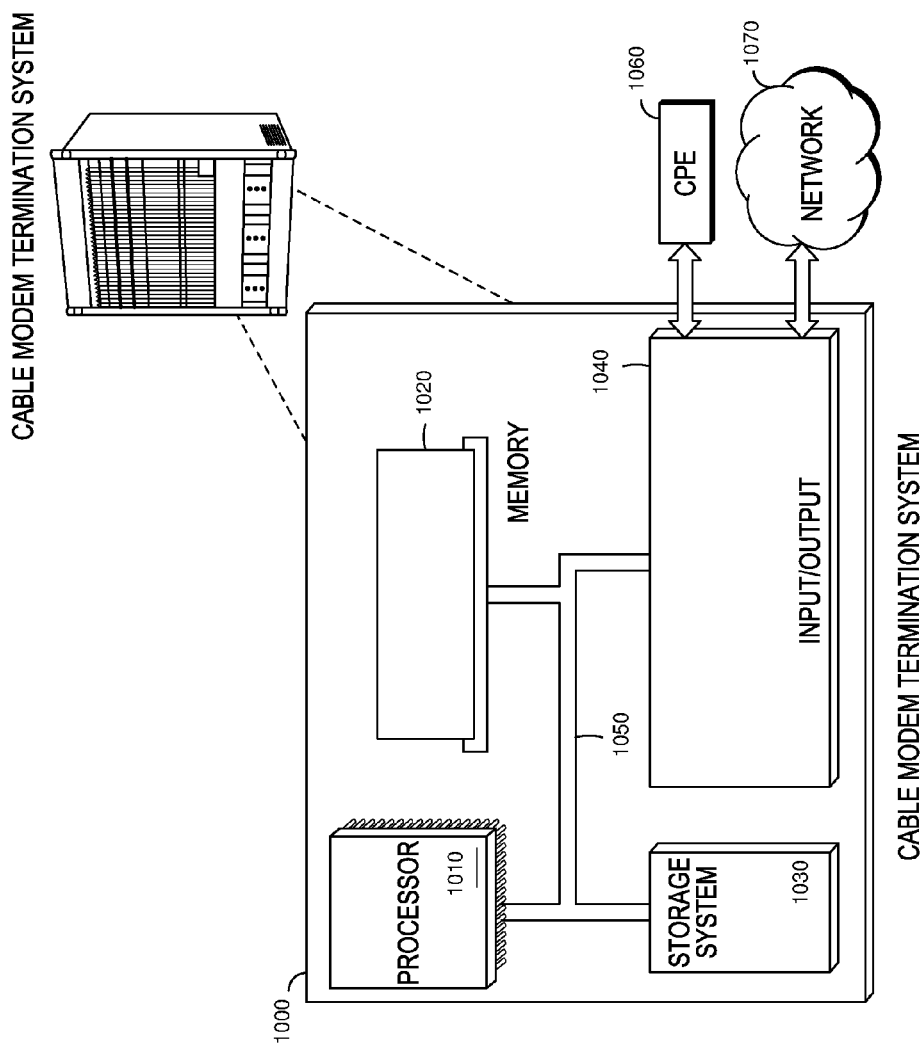
FIG. 10 is a block diagram of a hardware configuration operable to perform the functions disclosed herein.

FIG. 10 is a block diagram of a hardware configuration 1000 operable to perform scaling as disclosed herein for bandwidth distribution among service calls. It should be understood that the hardware configuration 1000 can exist in various types of devices. The hardware configuration 1000 can include a processor 1010, a memory 1020, a storage device 1030, and an input/output device 1040. Each of the components 1010, 1020, 1030, and 1040 can, for example, be interconnected using a system bus 1050. The processor 1010 can be capable of processing instructions for execution within the hardware configuration 1000. In one implementation, the processor 1010 can be a single-threaded processor. In another implementation, the processor 1010 can be a multi-threaded processor. The processor 1010 can be capable of processing instructions stored in the memory 1020 or on the storage device 1030.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). As described above, various units may be combined in a codec hardware unit or provided by a collection of interoperative hardware units, including one or more processors as described above, in conjunction with suitable software and/or firmware.

We claim:

1. A method comprising:
receiving a plurality of packets in a burst of packets in a buffer;
queuing the plurality of packets in the burst of packets in at least one queue in the buffer, the at least one queue having a designated priority;
measuring a total latency of the burst of packets representing a total number of intervals over which the plurality of packets are serviced and waiting in the at least one queue prior to packet servicing, wherein a latency in terms of intervals for each packet in the plurality of packets is a number of intervals the respective packet in the burst of packets waits until being serviced, including the interval in which the packet is serviced;
determining an average latency of the at least one queue based on the total latency for the burst of packets serviced over the plurality of intervals divided by a number of packets in the burst of packets serviced during the burst; and
outputting the average latency of the at least one queue.

2. The method of claim 1, further comprising servicing each individual packet one at a time in an order in which they are received.

3. The method of claim 1, wherein the burst is an isolated burst and no packets are queued either prior to or following the receipt of the plurality of packets in the isolated burst.

4. The method of claim 1, wherein a delay in servicing the burst of packets exists at a start of the receiving the plurality of packets in the burst.

5. The method of claim 4, wherein there are at least two queues each having a designated priority, the at least two queues including a lower priority queue having a lower priority than a higher priority queue, wherein the lower priority queue is not serviced due to the higher priority queue having a packet scheduled for servicing.

6. The method of claim 4, wherein the average latency accounts for the delay at the start of the burst.

7. The method of claim 1, wherein a last packet in the burst is delayed by several intervals.

8. The method of claim 7, wherein there are at least two queues each having a designated priority, the at least two queues including a lower priority queue having a lower priority than a higher priority queue, wherein the delay of the last packet in the lower priority queue is caused by the higher priority queue having several packets which need to be serviced before the last packet in the lower priority queue.

9. The method of claim 8, wherein the average latency accounts for the delay of the last packet in the burst.

10. The method of claim 1, wherein the burst occurs at an edge of an interval, and the total latency is attributed to a side of an interval boundary on which the burst occurred.

11. The method of claim 1, wherein the total latency of the burst of packets is a total latency determined across multiple intervals and is a weighted average based on an aggregate of interval latencies of a total number of packets serviced during the multiple intervals.

12. The method of claim 1, wherein the at least one queue is a priority queue of a multiplexer device.

13. The method of claim 1, wherein the at least one queue is a priority queue of a multiplexer-modulator device.

14. The method of claim 1, wherein the latency of each packet is measured in each interval without regard to when individual packets entered the queue or a duration over which each individual packet is in the queue.

* * * * *